(12) United States Patent
De Araujo et al.

(10) Patent No.: US 8,423,414 B2
(45) Date of Patent: Apr. 16, 2013

(54) METHOD AND SYSTEM FOR PAUSING, MIGRATING, AND RESTARTING RETAIL POINT-OF-SALE TRANSACTIONS

(75) Inventors: Daniel Fernando De Araujo, Round Rock, TX (US); Kumar Ravi, Cedar Park, TX (US); Radhakrishnan Sethuraman, Austin, TX (US); Manuel Silveyra, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 385 days.

(21) Appl. No.: 12/029,653

(22) Filed: Feb. 12, 2008

(65) Prior Publication Data
US 2009/0204504 A1 Aug. 13, 2009

(51) Int. Cl.
*G06Q 20/00* (2012.01)
*G06G 1/12* (2006.01)
*G06G 1/14* (2006.01)

(52) U.S. Cl.
USPC ............... 705/16; 705/18; 705/21; 705/22; 705/23

(58) Field of Classification Search .............. 705/16–18, 705/20–23
See application file for complete search history.

(56) References Cited

U.S. PATENT DOCUMENTS

| | | | |
|---|---|---|---|
| 6,243,447 B1 * | 6/2001 | Swartz et al. | 379/93.12 |
| 6,315,199 B1 * | 11/2001 | Ito et al. | 235/383 |
| 6,386,448 B1 * | 5/2002 | Addy | 235/383 |
| 2002/0062249 A1 * | 5/2002 | Iannacci | 705/14 |
| 2002/0065727 A1 | 5/2002 | Enoki et al. | |
| 2003/0065568 A1 * | 4/2003 | Kondo et al. | 705/19 |
| 2003/0187794 A1 | 10/2003 | Irwin et al. | |
| 2006/0129504 A1 * | 6/2006 | Nakajima | 705/75 |
| 2007/0040026 A1 | 2/2007 | Vleet et al. | |
| 2008/0097844 A1 * | 4/2008 | Hsu et al. | 705/14 |

* cited by examiner

*Primary Examiner* — Ig T An
(74) *Attorney, Agent, or Firm* — Yee & Associates, P.C.; Steven L. Bennett

(57) ABSTRACT

A computer implemented method, data processing system, and computer program product for managing transactions on point-of-sale terminals comprising a peer-to-peer network in a retail data processing system. A purchase transaction for a customer is initiated on a point-of-sale terminal in the system. Responsive to receiving a first input from a user of the point-of-sale terminal, the purchase transaction is suspended to form a suspended purchase transaction. Information about the customer is added to the suspended purchase transaction. The suspended purchase transaction is stored as a file on the point-of-sale terminal. Responsive to receiving a second input from the user of the point-of-sale terminal, a locally-stored list of suspended purchase transactions on the point-of-sale terminal is searched using the information about the customer. Responsive to locating the suspended transaction matching the information about the customer, the suspended transaction is selected to restart the suspended purchase transaction on the point-of-sale terminal.

14 Claims, 4 Drawing Sheets

METHOD AND SYSTEM FOR PAUSING, MIGRATING, AND RESTARTING RETAIL POINT-OF-SALE TRANSACTIONS

BACKGROUND OF THE INVENTION

1. Field of the Invention

The present invention relates generally to an improved data processing system, and in particular to a computer implemented method, data processing system, and computer program product for pausing, migrating, and restarting retail point-of-sale transactions to a different point-of-sale terminal.

2. Description of the Related Art

In a retail environment, customers typically experience delays in checkout lines to pay for purchased items, return merchandise, or signup for store credit cards. Customers who have large amounts of items to be purchased often cause the checkout line to stagnate. Such delays in the checkout process can result in delayed service to customers, poor customer satisfaction, and potentially fewer sales transactions.

A delay in the checkout process can also occur when a customer wants to purchase one or more additional items after the retail clerk has already started a checkout transaction for the customer's items. For example, the customer may need to step out of the checkout line to "quickly grab" the additional item in the store. In this situation, a retail clerk may perform one of the following example actions to resolve this situation. In the first example, the retail clerk may wait for the customer to return with the additional items, while the other customers continue to wait in the checkout line. In a second example, the retail clerk may cancel the current transaction for customer A on the clerk's register in order to service the next customer, customer B, in the checkout line. When customer A returns with the additional item, the retail clerk may then start a new transaction for customer A on the same register, wherein the clerk must ring up all of the items to be purchased by customer A, including those original items previously processed by the clerk and the new items. In the third example, the retail clerk may cancel the current transaction for customer A on the clerk's register, and then start a new transaction on a different register for customer B if the cancellation process takes some time to complete on the first register. When customer A returns with the additional item, the clerk still must ring up all of the items to be purchased by customer A, including those original items previously processed by the clerk and the new items. In the fourth example, the retail clerk may save the current transaction data for customer A on the clerk's register to a database managed by a store server. The retail clerk may then service other customers in line. When customer A returns with the additional item, the retail clerk may then start a new transaction for customer A on a different register by retrieving the saved current transaction data from the database. By using the saved transaction data, the clerk only needs to ring up the new items to be purchased by customer A for the new transaction.

While these existing solutions enable the retail clerk to allow the customer to purchase the customer's desired items, these existing solutions either require the retail clerk to delay the checkout process for other customers in line, cancel the current transaction for customer A and subsequently re-enter the same transaction data for the customer on the same or a different terminal, or require the retail system to have a dedicated store server which is used to manage the database and provide stored transaction data to the retail clerk at a different register when requested.

SUMMARY OF THE INVENTION

The illustrative embodiments provide a computer implemented method, data processing system, and computer program product for managing transactions on point-of-sale terminals comprising a peer-to-peer network in a retail data processing system. A purchase transaction for a customer is initiated on a point-of-sale terminal in the retail data processing system. Responsive to receiving a first input from a user of the point-of-sale terminal, the purchase transaction is suspended to form a suspended purchase transaction. Information about the customer is added to the suspended purchase transaction. The suspended purchase transaction is stored as a file on the point-of-sale terminal. Responsive to receiving a second input from the user of the point-of-sale terminal, a locally-stored list of suspended purchase transactions on the point-of-sale terminal is searched using the information about the customer. Responsive to locating the suspended transaction matching the information about the customer, the suspended transaction is selected to restart the suspended purchase transaction on the point-of-sale terminal.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
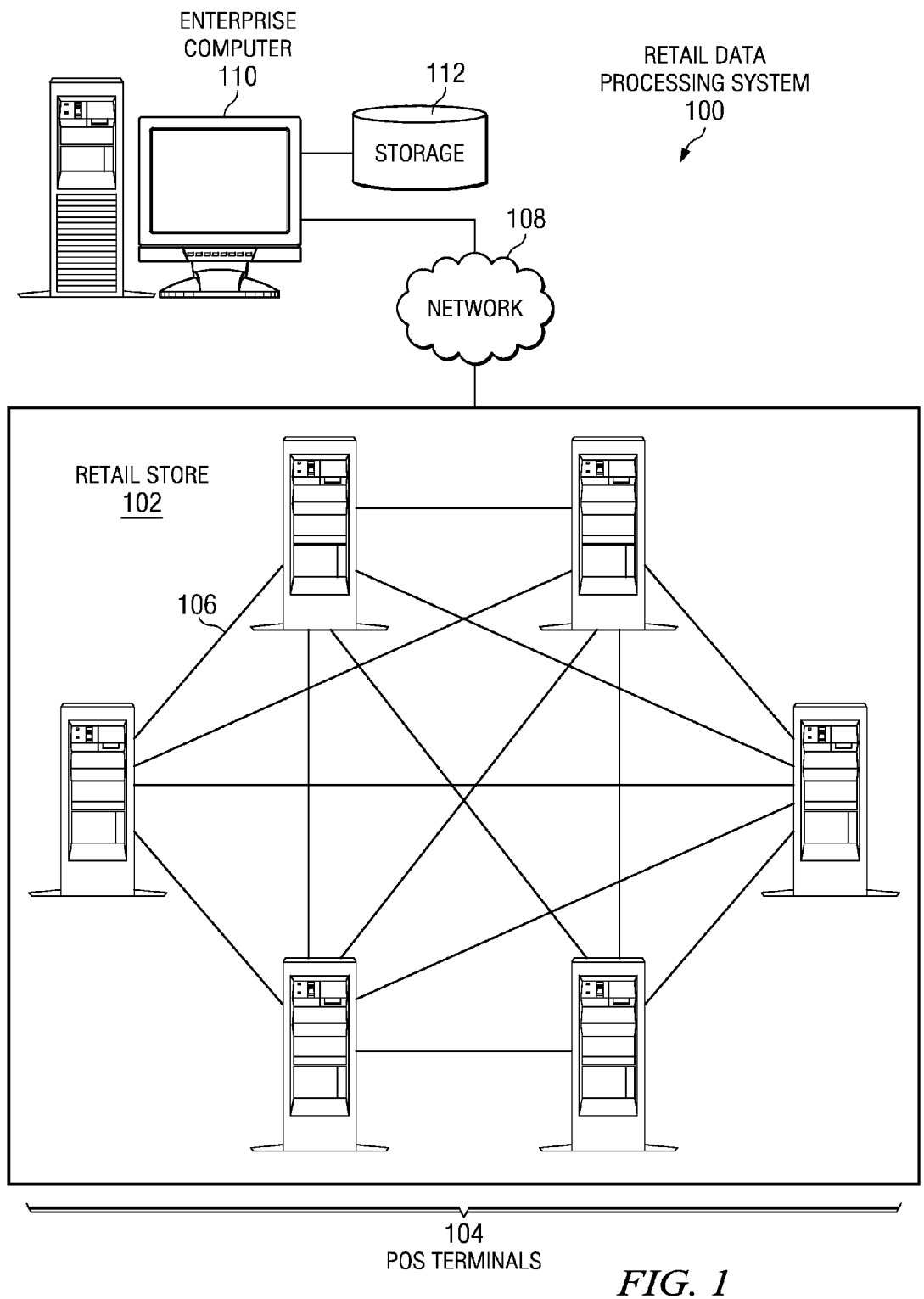
FIG. 1 depicts a pictorial representation of a retail data processing system in which the illustrative embodiments may be implemented.

The illustrative embodiments provide a mechanism for pausing and migrating point-of-sale (POS) transaction data without relying on a common storage server in the retail environment. As previously mentioned, some existing retail environments comprise a dedicated storage server which is used to manage a database of customer transaction data. During the checkout process, the dedicated storage server saves the customer transaction data comprising the items purchased by the customer. In situations where the customer wants to "quickly grab" additional items in the store after the clerk has started a transaction for the customer, the dedicated storage server enables the clerk to pause and restart that customer's transaction when the customer returns with the additional items on a different terminal. Use of the dedicated storage server allows the clerk to retrieve the stored customer transaction data from the database, without requiring the clerk to reenter or rescan the same items already processed, and without resulting in a delay in service to the other customers in the checkout line.

In some retail environments, however, the retail clerk may not have the option of retrieving stored transaction data from a database to continue processing the transaction. These retail environments typically contain stand-alone point-of-sale terminals or point-of-sale terminals networked together in a peer-to-peer (P2P) network. In either case, these retail environments do not contain a dedicated storage server for managing and storing customer transaction data in a database. Consequently, in situations where the customer wants to quickly grab additional items in the store after the clerk has started a transaction for the customer, the clerk in these retail environments must cancel the current transaction to prevent a delay in service in the checkout line. When the customer returns with the additional items, the clerk must scan the additional items retrieved by the customer, as well as rescan the same items previously processed by the clerk.

The illustrative embodiments provide a solution for pausing and migrating point-of-sale transaction data in retail environments which do not contain a dedicated store server for storing customer transaction data. The solution employs a peer-to-peer network comprising a plurality of point-of-sale terminals. In the peer-to-peer network environment, a terminal which comprises a point-of-sale system may be connected to another terminal using a closed Ethernet network. A point-of-sale system may be used in a wide variety of retail businesses, such as a supermarket, a convenience store, or the like, for performing such processes as calculating the total price of a purchase (goods or services) and calculating the amount of change due to a customer.

When a retail clerk starts a new transaction on a point-of-sale terminal in a server-less retail environment comprising a peer-to-peer network, the point-of-sale application in the point-of-sale terminal spawns a job related to the transaction in a container. The container creates a virtual environment in the point-of-sale terminal by which data for each transaction is cached and isolated from all other transactions. The container may hold data about a transaction, such as universal product code (UPC) information, stock keeping unit (SKU) information, item description, price, etc. Containerizing transactions in a point-of-sale terminal according to the illustrative embodiments allows a transaction to be started, paused, and restarted on the point-of-sale terminal by a retail clerk as needed. Thus, a retail clerk may pause a transaction for customer A, service the next customer (customer B) in the checkout line, and then resume the checkout process for customer A (without having to rescan items) by retrieving customer A's transaction data cached in the container.

In addition, as the point-of-sale terminals in the store environment comprise a peer-to-peer network, containerizing transactions in a point-of-sale terminal allows a transaction started on a first point-of-sale terminal to be paused and migrated to a second point-of-sale terminal in the network. The second point-of-sale terminal retrieves the paused transaction data cached in a container in the first point-of-sale terminal, and then uses the retrieved data to restart the transaction on the second point-of-sale terminal. The first point-of-sale terminal may then cancel the transaction on its own terminal. Thus, a virtual environment comprising transaction data created in one point-of-sale terminal may be transferred from client to client in the network without having to rely on a store server.

Consider, for example, the following scenario. A retail clerk scans all of a customer's items into the point-of-sale application. The point-of-sale application starts a new transaction, and a container is generated to hold the transaction data. If the customer wants to continue shopping, the retail clerk may suspend the transaction (i.e., pause it) by entering specific keystrokes on the terminal keypad or by touching a button on a touch-screen monitor. The clerk may then service other customers during this suspended period. When the customer returns to the terminal, the retail clerk may restart the suspended transaction by selecting the transaction from a list of known suspended transactions in the retail environment.

In another scenario, a customer wants to apply for a credit card during a period in which the store is busy. There is currently only one retail clerk on duty and the clerk must accept the application and scan all of the customer's items. When the clerk is halfway done with the application process, another retail clerk (who happens to know more about credit applications) boots another point-of-sale terminal. Rather than moving the customers in the checkout line to the new terminal or having the retail clerks swap terminals, the first clerk may suspend the transaction on the clerk's terminal. The second clerk may then restart the suspended transaction by selecting the transaction from a list of known suspended transactions in the retail environment. The second point-of-sale terminal obtains the suspended transaction information from the container of the first point-of-sale terminal, and the second clerk may now continue processing the transaction on the second point-of-sale terminal. In this manner, the customer's transaction may be migrated over to the new clerk/terminal.

The solution in the illustrative embodiments for pausing, migrating, and restarting point-of-sale transaction data without relying on a common storage server provide several advantages over existing systems. The illustrative embodiments allow for saving storage space, since no database is required to store the transaction data. In addition, since no database is required, the illustrative embodiments do not require a store server to run a database. Furthermore, with the mechanism of the illustrative embodiments, retail clerks do not have to cancel entire transactions and/or wait until the customer comes back from grabbing a quick item after a transaction for the customer has been started.

With reference now to the figures, FIG. 1 depicts a pictorial representation of a retail data processing system in which the illustrative embodiments may be implemented. A customer enters retail store 102 and collects items for purchase. The customer subsequently brings these items to point-of-sale terminals 104. Point-of-sale terminals 104 within retail store 102 may communicate with each other through peer-to-peer network 106. In peer-to-peer networks, each computer device, or node, can operate as a hub, i.e., each node has both client functionality and server functionality. Each node has a list of the network addresses of other nodes, or "peer nodes". These nodes can directly communicate with each other without a central or intermediate server.

Peer-to-peer network 106 is the medium used to provide communications links between the various point-of-sale terminals 104 within retail data processing system 100. Peer-to-peer network 106 may include connections, such as wire, wireless communication links, or fiber optic cables. The method by which nodes in a peer-to-peer network connect with each other may vary with the type of peer-to-peer network. Generally, a node is dynamically assigned a network address when the node connects to the network. The node then establishes a connection with the other nodes in the specified list of addresses within the network.

Point-of-sale terminals 104 may access information about a retail item based on, for example, universal product code (UPC) information or stock keeping unit (SKU) information for the item. The retail item information may include item description, price, and the like. Retail item information may be stored within each point-of-sale terminal. When a customer at one of point-of-sale terminals 104 presents items for purchase, identification information for the items is entered into the point-of-sale terminal. The identification information may include a SKU, UPC, or other product identifier, and may be scanned using a bar code reader or the like. The point-of-sale terminal may retrieve product data information for the identified product from local storage within the point-of-sale terminal, or, alternatively, from another point-of-sale terminal in peer-to-peer network 106.

In an optional embodiment, point-of-sale terminals 104 may be connected to network 108, although such a connection is not required for implementing the novel aspects of the illustrative embodiments. Network 108 may be implemented as a number of different types of networks, such as, for example, the Internet, an intranet, a local area network (LAN), or a wide area network (WAN). In the depicted example, enterprise computer 110 is connected to network 108 to enable point-of-sale terminals 104 to allow periodic product sales information to be uploaded to enterprise computer 110. Enterprise computer 110 comprises a central location in a distributed network where sales information for various retail stores may be collected and stored. For instance, at the end of each day, product sales data from retail store 102 is sent from point-of-sale terminals 104 to enterprise computer 110 via network 108. Product sales information received periodically at enterprise computer 110 may be stored in storage 112.

Retail data processing system 100 may include additional devices not shown. FIG. 1 is intended as an example, and not as an architectural limitation for the present invention.

Figure 2:
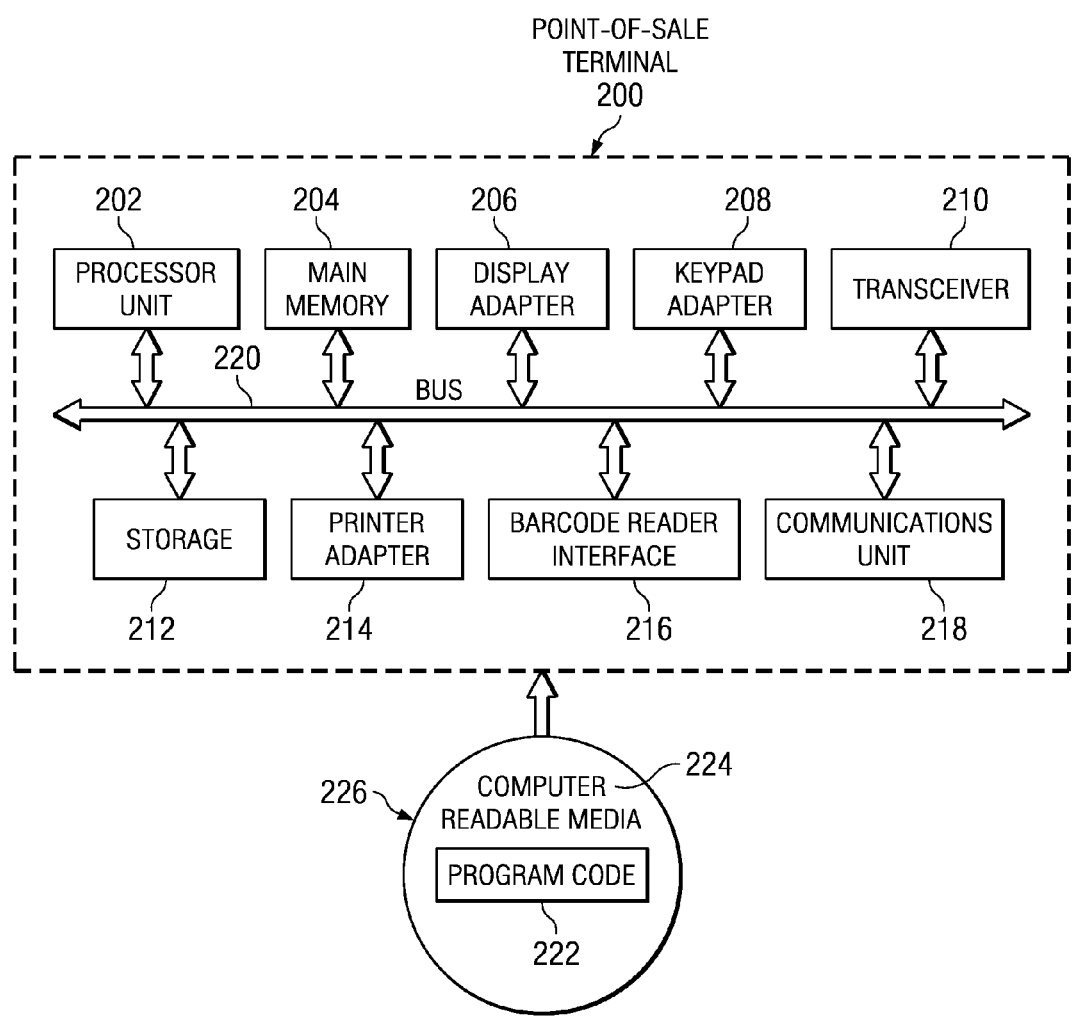
FIG. 2 is a block diagram of a point-of-sale device with which the illustrative embodiments may be implemented.

Turning now to FIG. 2, a block diagram illustrating the hardware configuration of a point-of-sale device is shown in accordance with the illustrative embodiments. Point-of-sale device 200 is an example of a point-of-sale device in which code or instructions implementing the processes of the present invention may be located. Point-of-sale device 200 employs a bus architecture. Processor unit 202 and main memory 204 are connected to communications fabric 220. Display adapter 206, keypad adapter 208, storage 212, printer adapter 214, barcode reader interface 216, and communications unit 218 are also connected to communications fabric 220.

Processor unit 202 serves to execute instructions for software that may be loaded into memory 204. Processor unit 202 may be a set of one or more processors or may be a multi-processor core, depending on the particular implementation. Further, processor unit 202 may be implemented using one or more heterogeneous processor systems in which a main processor is present with secondary processors on a single chip. As another illustrative example, processor unit 202 may be a symmetric multi-processor system containing multiple processors of the same type.

Memory 204, in these examples, may be, for example, a random access memory or any other suitable volatile or non-volatile storage device. Persistent storage 212 may take various forms depending on the particular implementation. For example, persistent storage 212 may contain one or more components or devices. For example, persistent storage 212 may be a hard drive, a flash memory, a rewritable optical disk, a rewritable magnetic tape, or some combination of the above. The media used by persistent storage 212 also may be removable. For example, a removable hard drive may be used for persistent storage 212.

Communications unit 218, in these examples, provides for communications with other data processing systems or devices, such as other point-of-sale terminals in the retail store. In these examples, communications unit 218 is a network interface card. Communications unit 218 may provide communications through the use of either or both physical and wireless communications links.

Display adapter 206 provides a mechanism to display information to a user. Keypad adapter 208 provides a mechanism for user input through a keyboard or mouse. Printer adapter 214 provides a mechanism for sending output, such as a sales receipt, to a printing device.

Barcode reader interface 216 may receive information, such as product selection information, from a barcode reader. Transceiver 210, connected to bus 220, may receive information, such as a product identifier, from a radio frequency (RF) price tag. RF price tags may also store other information, such as a product data structure, mismatch data structure, and/or match data structure.

An operating system runs on processor unit 202 and is used to coordinate and provide control of various components within point-of-sale device 200 in FIG. 2. The operating system may be a commercially available operating system; however, the point-of-sale device may alternatively include specialized code for the point-of-sale device. Instructions for the operating system and applications or programs are located on storage devices, such as storage 212, and may be loaded into main memory 204 for execution by processor unit 202.

The processes of the illustrative embodiments may be performed by processor unit 202 using computer implemented instructions, which may be located in a memory, such as memory 204. These instructions are referred to as program code, computer usable program code, or computer readable program code that may be read and executed by a processor in processor unit 202. The program code in the different embodiments may be embodied on different physical or tangible computer readable media, such as memory 204 or persistent storage 212.

Program code 222 is located in a functional form on computer readable media 224 that is selectively removable and may be loaded onto or transferred to point-of-sale device 200 for execution by processor unit 202. Program code 222 and computer readable media 224 form computer program product 226 in these examples. In one example, computer readable media 224 may be in a tangible form, such as, for example, an optical or magnetic disc that is inserted or placed into a drive or other device that is part of persistent storage 212 for transfer onto a storage device, such as a hard drive that is part of persistent storage 212. In a tangible form, computer readable media 224 also may take the form of a persistent storage, such as a hard drive, a thumb drive, or a flash memory that is connected to point-of-sale device 200. The tangible form of computer readable media 224 is also referred to as computer recordable storage media. In some instances, computer readable media 224 may not be removable.

Alternatively, program code 222 may be transferred to point-of-sale device 200 from computer readable media 224 through a communications link to communications unit 218. The communications link may be physical or wireless in the illustrative examples. The computer readable media also may take the form of non-tangible media, such as communications links or wireless transmissions containing the program code.

The different components illustrated for point-of-sale device 200 are not meant to provide architectural limitations to the manner in which different embodiments may be implemented. The different illustrative embodiments may be implemented in a data processing system including components in addition to or in place of those illustrated for point-of-sale device 200. Other components shown in FIG. 2 can be varied from the illustrative examples shown.

As one example, a storage device in point-of-sale device 200 is any hardware apparatus that may store data. Memory 204, persistent storage 212 and computer readable media 224 are examples of storage devices in a tangible form. In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 204 or a cache such as found in an interface and memory controller hub that may be present in communications fabric 202.

Figure 3:
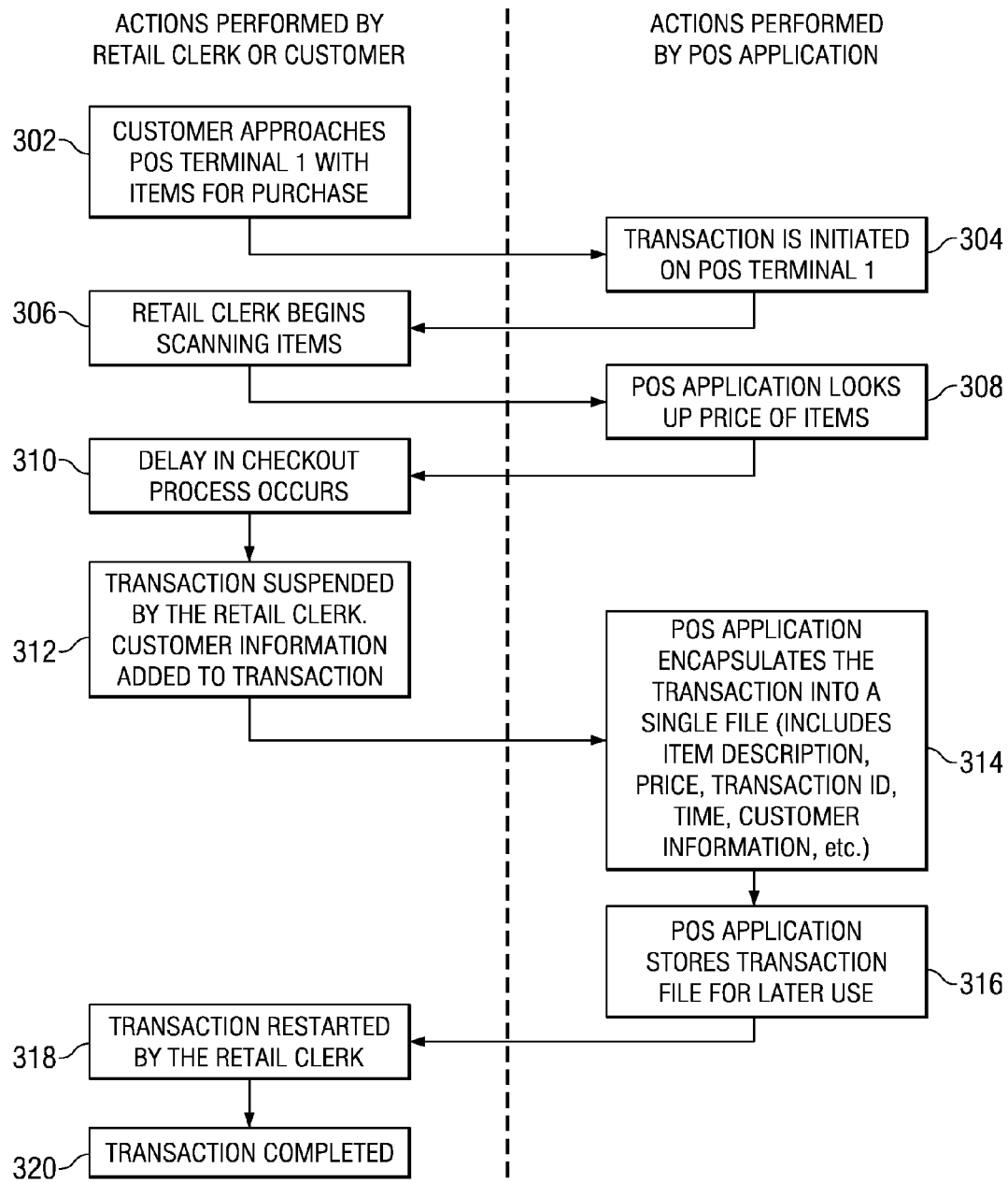
FIG. 3 is a flowchart of a process for pausing and restarting retail point-of-sale transactions in accordance with the illustrative embodiments.

FIG. 3 is a flowchart of a process for pausing and restarting retail point-of-sale transactions in accordance with the illustrative embodiments. The process described in FIG. 3 may be implemented in a retail data processing system comprising a peer-to-peer network of point-of-sale devices as illustrated in FIG. 1.

The process begins when a customer approaches point-of-sale terminal 1 in the retail store environment in order to purchase items (step 302). The retail clerk initiates a customer transaction on point-of-sale terminal 1 (step 304). The retail clerk may scan the barcode or SKU number of the first item for purchase by the customer into point-of-sale terminal 1 (step 306). The point-of-sale application within point-of-sale terminal looks up the price of the item corresponding to the barcode or SKU number (step 308).

At any point in the current customer transaction, an event may occur which may delay the checkout process (step 310). Examples of such an event include the current customer wanting to go and get an additional item for purchase or the retail employee needing to verify the price marked on an item. In such a situation, the retail clerk may suspend the current transaction (step 312). To suspend the transaction, the clerk may select an option on the keypad or on a touch screen display of the point-of-sale device. The retail clerk may also input an identifier about the customer when suspending the current transaction, such as the customer's name.

When the point-of-sale application receives the suspend request from the retail clerk, the point-of-sale application encapsulates the transaction by storing the transaction information into a single file (container) (step 314). The information about the transaction in the file may include the transaction ID and information about the product item, such as the name, description, and price of the item, as well as the transaction time. The point-of-sale application then stores the suspended transaction in the transaction file within memory in the point-of-sale terminal for later use (step 316), such as when the customer has returned from fetching an additional item in the store for purchase. Storing the transaction file in this manner allows the retail clerk to start a new transaction for the next customer in line without having cancel the current transaction or wait for the customer to return with the additional item.

When the customer has returned with the additional item, the retail clerk may restart the suspended transaction for the customer by searching the list of suspended transactions stored on point-of-sale terminal 1 using the customer identifier (customer's name) (step 318). The clerk may select the suspended transaction from the list of suspended transactions on the display screen of point-of-sale terminal 1. Since the point-of-sale application provides the transaction information for the customer to the retail clerk, the retail clerk only needs to scan items which the clerk did not process prior to suspending the transaction. The transaction may then be completed (320).

Figure 4:
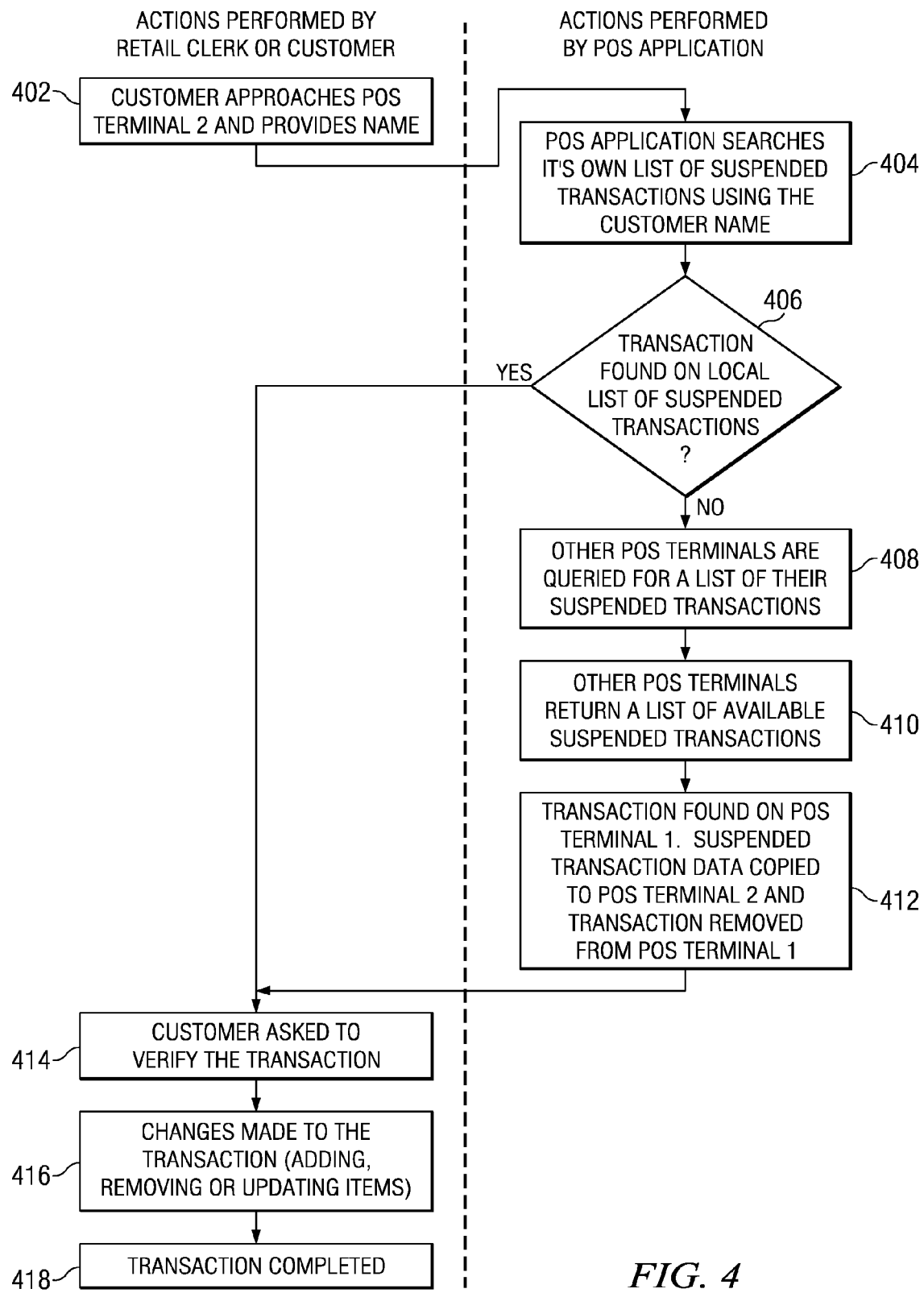
FIG. 4 is a flowchart of a process for migrating retail point-of-sale transactions to a different point-of-sale terminal in accordance with the illustrative embodiments.

FIG. 4 is a flowchart of a process for migrating retail point-of-sale transactions to a different point-of-sale terminal in accordance with the illustrative embodiments. The process described in FIG. 4 may be implemented in a retail data processing system comprising a peer-to-peer network of point-of-sale devices as illustrated in FIG. 1. The process described in FIG. 4 may be implemented in response to a transaction being suspended on any of the point-of-sale terminals in the peer-to-peer network in the retail data processing system.

The process begins when a customer approaches point-of-sale terminal 2 in the retail store environment to continue a previous transaction initiated on another point-of-sale terminal (e.g., point-of-sale terminal 1 in FIG. 3) and the retail clerk inputs a customer identifier, such as the customer's name (step 402). The point-of-sale application on point-of-sale terminal 2 searches the list of suspended transactions stored locally using the customer identifier (customer's name) (step 404). A determination is then made by point-of-sale terminal 2 as to whether the transaction is found on the local list of suspended transactions (step 406). If the transaction is found on the local list of suspended transactions ('yes' output of step 406, the process continues to step 414.

If the transaction is not found on the local list of suspended transactions ('no' output of step 406, the point-of-sale application on point-of-sale terminal 2 queries the other point-of-sale terminals in the network to obtain a list of each of the other terminal's list of locally suspended transactions (step 408). Each of the other point-of-sale terminals sends their list to point-of-sale terminal 2 (step 410).

When a transaction matching the customer identifier is found on one of the other point-of-sale terminals' list of suspended transactions (in this case, in point-of-sale terminal 1), point-of-sale terminal 2 obtains the suspended transaction from point-of-sale terminal 1 (step 412). In addition, once the transaction has been copied to point-of-sale terminal 2, point-of-sale terminal 1 removes the transaction from its list of suspended transactions.

After the transaction has been migrated to point-of-sale terminal 2, retail clerk at point-of-sale terminal 2 asks the customer to verify the content of the transaction (step 414). The retail clerk then updates the transaction by scanning new items for purchase by the customer, removing any items from the transaction that the customer does not want, or updating the item information (e.g., price change) in the transaction (step 416). The transaction may then be completed (418).

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for managing transactions on point-of-sale terminals comprising a peer-to-peer network in a retail data processing system, the computer implemented method comprising:
    initiating a purchase transaction for a customer on a point-of-sale terminal in the peer-to-peer network in the retail data processing system;
    responsive to receiving a first input from a user of the point-of-sale terminal, suspending the purchase transaction to form a suspended purchase transaction;
    adding information about the customer to the suspended purchase transaction;
    storing the suspended purchase transaction as a file on the point-of-sale terminal;
    responsive to receiving a second input from the user of the point-of-sale terminal, searching a locally-stored list of suspended purchase transactions on the point-of-sale terminal using the information about the customer;
    responsive to locating the suspended transaction matching the information about the customer in the file on the point-of-sale terminal, selecting the suspended transaction to restart the suspended purchase transaction on the point-of-sale terminal; and
    responsive to storing the purchase transaction and the information about the customer as a file on the point-of-sale terminal, migrating the suspended purchase transaction to a second point-of-sale terminal, wherein migrating the suspended purchase transaction to a second point-of-sale terminal comprises:
        responsive to receiving information about the customer at the second point-of-sale terminal, querying other point-of-sale terminals in the retail data processing system for suspended purchase transactions located on the other point-of-sale terminals;
        responsive to receiving lists of suspended purchase transactions from the other point-of-sale terminals, searching the lists of suspended purchase transactions stored on the other point-of-sale terminals using the information about the customer;
        responsive to locating a suspended transaction matching the information about the customer on one terminal of the other point-of-sale terminals, copying the suspended purchase transaction stored on the terminal to the second point-of-sale terminal; and
        restarting the suspended purchase transaction on the second point-of-sale terminal.

2. The computer implemented method of claim 1, further comprising:
    responsive to storing the file in memory on the point-of-sale terminal, initiating a purchase transaction for a second customer on the point-of-sale terminal.

3. The computer implemented method of claim 1, wherein the file includes at least one of a purchase transaction ID, product item name, product item description, product item price, a time the purchase transaction was initiated, and a time the purchase transaction was suspended.

4. The computer implemented method of claim 1, further comprising:
    updating the restarted purchase transaction on the second point-of-sale terminal by adding, removing, or changing items stored in the transaction.

5. The computer implemented method of claim 1, wherein copying the suspended purchase transaction includes removing the suspended purchase transaction from the terminal.

6. The computer implemented method of claim 1, wherein the retail data processing system is a server-less data processing system which does not contain a dedicated server that stores customer transaction data for all the transactions.

7. A computer program product for managing transactions on point-of-sale terminals comprising a peer-to-peer network in a retail data processing system, the computer program product comprising:
    a computer readable storage medium having computer usable program code stored thereon, the computer usable program code comprising:
    computer usable program code for initiating a purchase transaction for a customer on a point-of-sale terminal in the peer-to-peer network in the retail data processing system;
    computer usable program code for suspending, in response to receiving a first input from a user of the point-of-sale terminal, the purchase transaction to form a suspended purchase transaction;
    computer usable program code for adding information about the customer to the suspended purchase transaction;
    computer usable program code for storing the suspended purchase transaction as a file on the point-of-sale terminal;
    computer usable program code for searching, in response to receiving a second input from the user of the point-of-sale terminal, a locally-stored list of suspended purchase transactions on the point-of-sale terminal using the information about the customer;
    computer usable program code for selecting, in response to locating the suspended transaction matching the information about the customer in the file on the point-of-sale terminal, the suspended transaction to restart the suspended purchase transaction on the point-of-sale terminal; and computer usable program code for migrating, in response to storing the purchase transaction and the information about the customer as a file on the point-of-sale terminal, the suspended purchase transaction to a second point-of-sale terminal, wherein the computer usable program code for migrating the suspended purchase transaction to a second point-of-sale terminal comprises:

computer usable program code for querying, in response to receiving information about the customer at the second point-of-sale terminal, other point-of-sale terminals in the retail data processing system for suspended purchase transactions located on the other point-of-sale terminals;

computer usable program code for searching, in response to receiving lists of suspended purchase transactions from the other point-of-sale terminals, the lists of suspended purchase transactions stored on the other point-of-sale terminals using the information about the customer;

computer usable program code for copying, in response to locating a suspended transaction matching the information about the customer on one terminal of the other point-of-sale terminals, the suspended purchase transaction stored on the terminal to the second point-of-sale terminal; and computer usable program code for restarting the suspended purchase transaction on the second point-of-sale terminal.

8. The computer program product of claim 7, further comprising:

computer usable program code for initiating, in response to storing the file in memory on the point-of-sale terminal, a purchase transaction for a second customer on the point-of-sale terminal.

9. The computer program product of claim 7, wherein the file includes at least one of a purchase transaction ID, product item name, product item description, product item price, a time the purchase transaction was initiated, and a time the purchase transaction was suspended.

10. The computer program product of claim 7, further comprising:

computer usable program code for updating the restarted purchase transaction on the second point-of-sale terminal by adding, removing, or changing items stored in the transaction.

11. The computer program product of claim 7, wherein the computer usable program code for copying the suspended purchase transaction includes computer usable program code for removing the suspended purchase transaction from the terminal.

12. The computer program product of claim 7, wherein the retail data processing system is a server-less data processing system which does not contain a dedicated server that stores customer transaction data for all the transactions.

13. A data processing system for managing transactions on point-of-sale terminals comprising a peer-to-peer network in a retail data processing system, the data processing system comprising:

a bus;

a storage device connected to the bus, wherein the storage device contains computer usable code;

at least one managed device connected to the bus;

a communications unit connected to the bus; and a processing unit connected to the bus, wherein the processing unit executes the computer usable code to initiate a purchase transaction for a customer on a point-of-sale terminal in the peer-to-peer network in the retail data processing system; suspend, in response to receiving a first input from a user of the point-of-sale terminal, the purchase transaction to form a suspended purchase transaction; add information about the customer to the suspended purchase transaction; store the suspended purchase transaction as a file on the point-of-sale terminal; search, in response to receiving a second input from the user of the point-of-sale terminal, a locally-stored list of suspended purchase transactions on the point-of-sale terminal using the information about the customer; select, in response to locating the suspended transaction matching the information about the customer in the file on the point-of-sale terminal, the suspended transaction to restart the suspended purchase transaction on the point-of-sale terminal; and migrate, in response to storing the purchase transaction and the information about the customer as a file on the point-of-sale terminal, the suspended purchase transaction to a second point-of-sale terminal, wherein the computer usable code to migrate the suspended purchase transaction to a second point-of-sale terminal comprises computer usable code to query, in response to receiving information about the customer at the second point-of-sale terminal, other point-of-sale terminals in the retail data processing system for suspended purchase transactions located on the other point-of-sale terminals; search, in response to receiving lists of suspended purchase transactions from the other point-of-sale terminals, the lists of suspended purchase transactions stored on the other point-of-sale terminals using the information about the customer; copy, in response to locating a suspended transaction matching the information about the customer on one terminal of the other point-of-sale terminals, the suspended purchase transaction stored on the terminal to the second point-of-sale terminal; and restart the suspended purchase transaction on the second point-of-sale terminal.

14. The data processing system of claim 13, wherein the processing unit further executes the computer usable code to initiate, in response to storing the file in memory on the point-of-sale terminal, a purchase transaction for a second customer on the point-of-sale terminal.

* * * * *